United States Patent [19]
Goldberg

[11] Patent Number: 5,854,865
[45] Date of Patent: Dec. 29, 1998

[54] METHOD AND APPARATUS FOR SIDE PUMPING AN OPTICAL FIBER

[75] Inventor: Lew Goldberg, Fairfax, Va.

[73] Assignee: The United States of America as represented by the Secretary of the Navy, Washington, D.C.

[21] Appl. No.: 568,859

[22] Filed: Dec. 7, 1995

[51] Int. Cl.⁶ .................................. G02B 6/26; H01S 3/30
[52] U.S. Cl. ................................ 385/31; 385/49; 385/88; 372/6
[58] Field of Search .................................. 385/31, 49, 88, 385/32, 123; 372/6

[56] References Cited

U.S. PATENT DOCUMENTS

| | | | |
|---|---|---|---|
| 4,130,343 | 12/1978 | Miller et al. | 385/49 |
| 4,165,496 | 8/1979 | Di Domenico, Jr. et al. | 385/48 |
| 4,923,279 | 5/1990 | Ainslie et al. | 372/6 |
| 5,037,172 | 8/1991 | Hekman et al. | 385/31 |
| 5,163,113 | 11/1992 | Melman | 385/31 |
| 5,170,458 | 12/1992 | Aoyagi et al. | 372/6 |
| 5,187,760 | 2/1993 | Huber | 372/6 |
| 5,268,910 | 12/1993 | Huber | 372/6 |
| 5,278,850 | 1/1994 | Ainslie et al. | 372/6 |
| 5,292,320 | 3/1994 | Brown et al. | 606/15 |
| 5,491,581 | 2/1996 | Roba | 372/6 |
| 5,530,709 | 6/1996 | Waarts et al. | 372/6 |

FOREIGN PATENT DOCUMENTS

| | | | |
|---|---|---|---|
| 55-84907 | 6/1980 | Japan | 385/31 |
| 2-131201 | 5/1990 | Japan | 385/31 |

*Primary Examiner*—Hemang Sanghavi
*Attorney, Agent, or Firm*—Thomas E. McDonnell; Chester Jordan

[57] ABSTRACT

A technique for the efficient coupling of pump light into a fiber by injecting the light through the side of a fiber leaving the fiber ends accessible to input and output coupling. This technique relies on the fabrication of a groove or a microprism into the side of the fiber. The groove shape is adapted effective to the variables of light wavelength, orientation of the source and variables relating to fiber construction so as to allow the efficient injection of pump light. Light emerging from a laser diode or other suitable means for launching light placed on the opposite side of the fiber, and in proximity to the fiber wall, propagates laterally through the fiber and impinges on the sides of the groove. The vertical rays impinging on the grove facets are specularly reflected and directed along the horizontal fiber axis of the outer core. By employing a reflective coating on the groove, the reflectivity of the groove facets approach 100% for a wide range of incidence angles. In this manner one can launch external optical signals into an optical fiber.

25 Claims, 4 Drawing Sheets

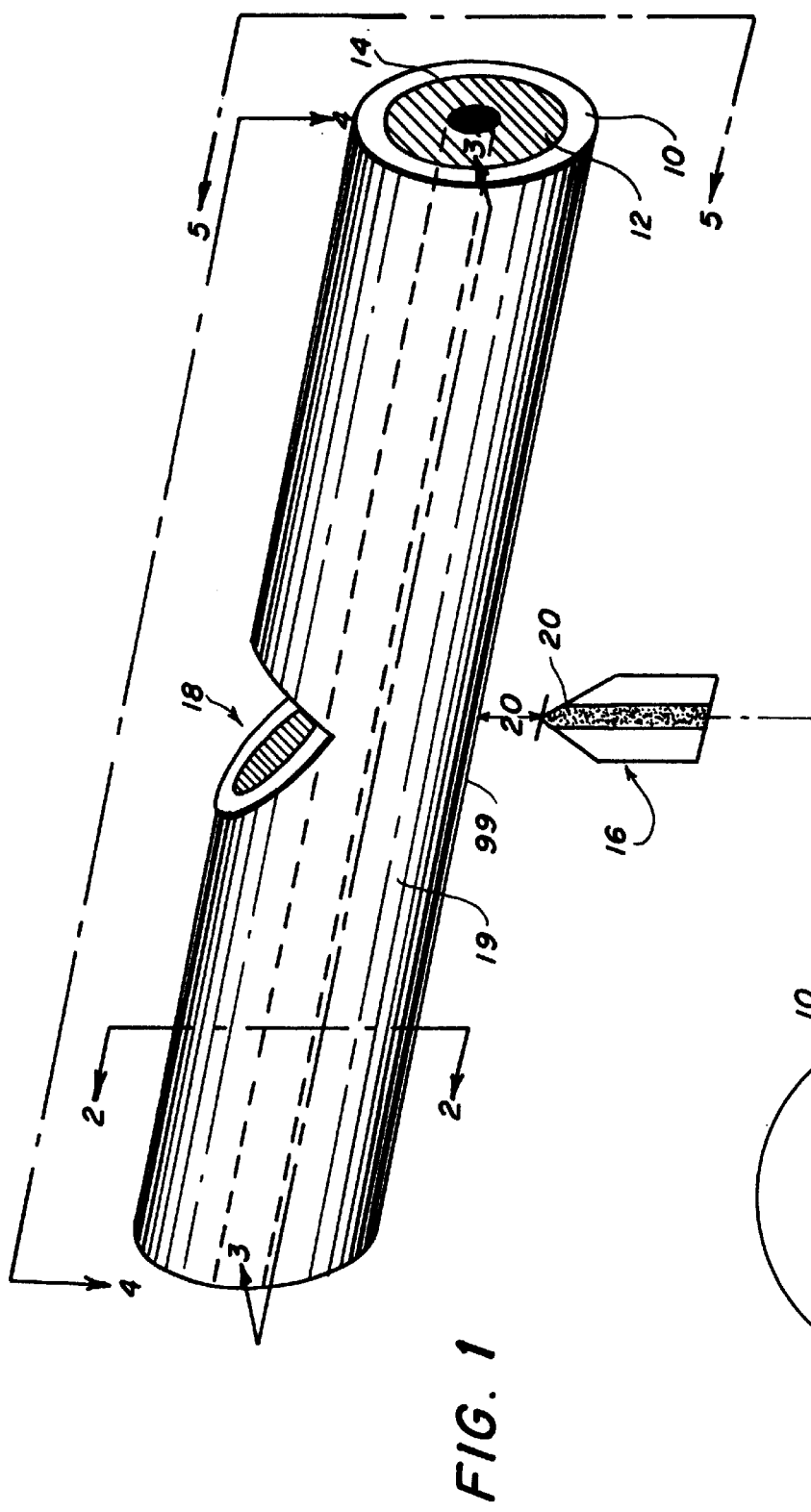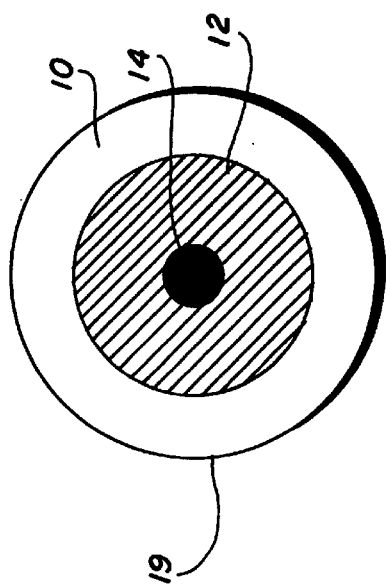

METHOD AND APPARATUS FOR SIDE PUMPING AN OPTICAL FIBER

BACKGROUND OF THE INVENTION

1. Field of the Invention

The present invention relates generally to a technique of coupling pump light into a fiber waveguide through the side of the fiber cladding and to fiber optic amplifiers and lasers particularly.

2. Description of the Related Art

Launching an optical signal into an optical fiber is one of the most basic problems confronting scientist and engineers who design, build, and employ fiber optic systems. The manipulation of optical signals once propagating in an optical fiber represents an equally challenging problem to those attempting to use optical fibers to transmit information or other signals. It is generally accepted that an optical signal propagating in an optical fiber may be manipulated by launching or coupling light of differing wavelengths into the same fiber.

These fibers are often coupled to laser light sources which act as pumps for the information coded therein. Of the methods used to couple pump light to optical fibers, pigtailing is a preferred method. Typically single spatialmode, diffraction limited laser diodes with an emission aperture of approximately 1×3 $\mu$m are used to achieve efficient diode to fiber coupling. Pump light is injected into the fiber core by proximity coupling into the polished face of the fiber, or by using small lenses between the laser aperture and the input face of the fiber. This fiber pigtailing process is expensive because of the sub- $\mu$m alignment and mechanical stability required to achieve efficient and stable laser to fiber coupling.

The use of optical fibers with doped cores has become an indispensable tool in building optical systems for the transmission and amplification of optical information signals. Doping these fibers with different ions produces optical gain for light propagating in the fiber core at various wavelength ranges.

Optical gain for a signal propagating in the doped fiber core occurs when population inversion in the inner core material is induced by the absorption of pump light. For the majority of systems, pump light is coupled directly into the inner core via a wavelength selected fused fiber coupler. However, these fused fiber couplers, which allow the pump light coupling and constitute wavelength division multiplexers, add complexity and expense.

A current development in the art is the use of an active fiber configuration with a double cladded structure. The double cladded structure consists of a single mode fiber inner core, an outer core and an outer cladding. The refractive index is highest in the inner core and lowest in the outer cladding, so that both the fiber inner core and the outer core function as optical waveguides. The important feature of the double cladded structure is that light can be injected into the outer core where it propagates until it is absorbed by the active dopant in the fiber inner core.

The index difference between the outer core and the outer cladding is made relatively large, so that the effective numerical aperture (critical angle) of the outer core waveguide is very large, typically above 0.3. The large diameter and numerical aperture of the outer core waveguide make it possible to efficiently couple spatially incoherent emission from high power, large aperture, broad area laser diodes or laser diode arrays. These pump lasers typically generate 1–2 W from an emission area of 1 $\mu$m by 100 $\mu$m, or a factor of ten greater power than is available from single mode laser diodes pigtailed into a single mode fiber. An important advantage of the broad area laser diodes is that their cost is approximately ten times smaller that of pigtailed single mode laser diodes.

High power, double core fiber amplifiers and lasers can be constructed by end-pumping using multiple large active area diodes. However, this configuration does not provide access to both ends of the fiber, thus diminishing flexibility in source placement. The double core design fibers can also in principle be pumped at multiple points by using special types of fused fiber couplers which allow pump light transfer from a multimode fiber into the outer core but do not disturb the signal propagating in the fiber inner core. This however, is accomplished at the expense of efficiency, complexity and cost.

SUMMARY OF THE INVENTION

It is an object of this invention to efficiently couple pump light from a pump laser into an optical fiber waveguide.

Another object of the present invention is to provide a means for coupling light from multiple pump lasers into a single fiber to achieve high output in optical fiber amplifiers, and fiber lasers.

Yet another object of the present invention is to provide a means for efficient coupling of pump light from spatially incoherent, large active area, high power laser diode arrays or broad stripe diode lasers into the fiber.

A further object of this invention is to eliminate the need for wavelength division multiplexing fiber couplers.

Yet a further object of the present invention is to provide a means for injecting pump light through the side of the fiber leaving the fiber ends accessible for input and output coupling of the signal light.

Yet another objective is to reduce the cost of the overall system by permitting efficient coupling with less expensive lasers.

Yet a further object of the present invention is to provide a means for injecting pump light from multiple lasers through the side of the fiber leaving the fiber ends accessible for input and output coupling of the signal light.

In accordance with these and other objects made apparent hereafter, the invention concerns a technique for the efficient coupling of pump light into a fiber by injecting the light through the side of a fiber leaving the fiber ends accessible to input and output coupling. This technique relies on the fabrication of a groove or a micro-prism into the side of the fiber. The groove shape is adapted effective to the variables of light wavelength, orientation of the source and variables relating to fiber construction so as to allow the efficient injection of pump light. Light emerging from a laser diode or other suitable means for launching light placed on the opposite side of the fiber, and in proximity to the fiber wall, propagates laterally through the fiber and impinges on the sides of the groove. The vertical rays impinging on the grove facets are reflected and directed along the horizontal fiber axis of the outer core. By employing a reflective coating on the groove, the reflectivity of the groove facets approach 100% for a wide range of incidence angles. In this manner one can launch external optical signals into an optical fiber.

These and other objects, features and advantages of the invention will become better understood by reference to the following detailed description when considered in connection with the accompanying drawings wherein like reference numerals and symbols designate identical or corresponding parts throughout the several views, while equivalent elements bear a prime designation.

BRIEF DESCRIPTION OF THE DRAWINGS

FIG. 1. is an elevational view of an optical fiber according to the invention.

FIG. 2. is a cross sectional view in the direction of 2—2 of FIG. 1.

DETAILED DESCRIPTION

Figure 3:
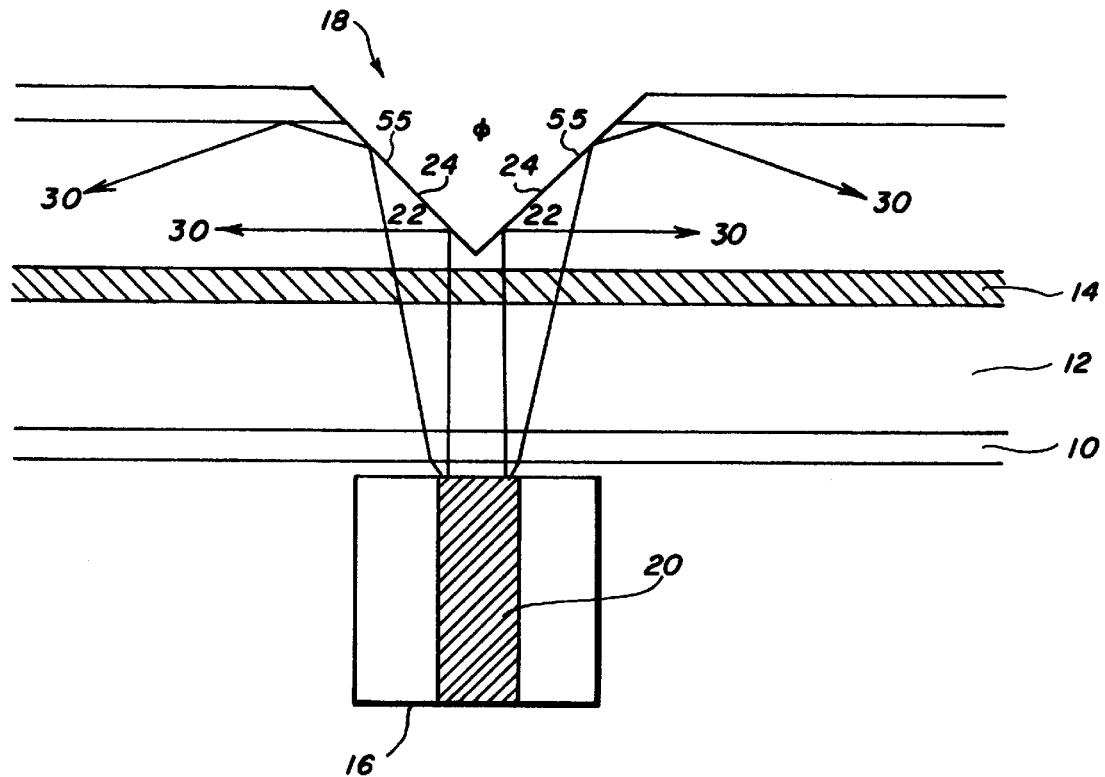
FIG. 3. is a side eleveational view in the direction indicated as 3—3 in FIG. 1.

Referring now to the drawings, and in particular to FIGS. 1–2, which shows an optical fiber 19 and laser light source 16. Fiber 19 has an inner core 14, an outer core 12 disposed about the inner core, and an outer cladding 10 disposed about the outer core 12. The outer core and outer claddings 10, 12 have groove 18 and facets 22 disposed thereon. Laser light source 16 is disposed opposite groove 18 and facets 22 to direct light 30 across interface 20 into the fiber 19, and transverse to inner core 14 and outer core 12 and outer cladding 10. Groove 18 and facets 22 are selected so that light incident thereon from laser 16 will undergo specular reflection, for reasons discussed below.

FIG. 2 is a cross sectional view of the optical fiber. The refraction index is usually lowest in outer cladding 10, with the highest index of refraction located in inner core 14. A lower index of refraction in outer cladding 10, allows outer core 12 and inner core 14 to function as optical waveguides, efficiently propagating light within the fiber 19, minimizing energy loss through the outer cladding 10.

With reference to FIG. 3, groove 18 is fabricated into fiber outer core 12 and outer cladding 10. Groove 18 extends through outer cladding 10, and into outer core 12. A broad area laser diode 16 is the laser light source 16; however other light sources which launch light 30 at useful wavelengths and intensities are suitable.

In operation laser light diode 16 launches light 30 through fiber outer cladding 10, and outer core 12 and onto faceted surface 22 of groove 18. The light 30, emitted by diode 16, impinges on faceted surface 22 of groove 18 and is specularly reflected into fiber 19. Specular reflection, ensures maximum reflection into outer core 12, because this minimizes further divergence of the incident light 30. The light 30 is reflected by faceted surface 22 of groove 18 and injected into outer core 12 of the fiber 19. In this manner, one can inject any optical signal into an optical fiber 19 having a groove such as 18. In an embodiment employing a cladded fiber 19, inner core 14, may contain an active medium, such as an Er or other dopant, which at a selected wavelength absorbs the light 30 propagating in the inner core 14, activating the Er and permitting it to function as an amplifier for any other optical signal propagating in inner core 14.

For example, assume a typical outer core 12 diameter of 125 $\mu$m and inner core 14 diameter of 10 $\mu$m. Further assuming the angle $\phi$ of groove 18 is 90°, a maximum groove 18 depth and width of 52.5 $\mu$m and 105 $\mu$m, respectively is suggested. This provides for 5 $\mu$m clearance between groove 18 and inner core 14, disposing groove 18's apex slightly above inner core 14, allowing unobstructed propagation of an optical signal in inner core 14. Light 30 emerging from laser diode 16 or other type pump laser, placed on the opposite side of the fiber 19, and in proximity to fiber outer cladding 10, propagates laterally through fiber 16, impinges on the sides of groove 18, undergoes specular reflection, and is injected into outer core 12.

If the above exampled embodiment employs a glass fiber with a refractive index of 1.5, the critical angle required for total internal reflection is 41° relative to the surface normal, and vertical rays impinging at 45° on air-to-glass groove facets 24 are totally reflected and directed along the horizontal fiber axis. For a typical broad area laser diode 16, the emission divergence angle in the junction plane is 10° FWHM in air or 6.6° inside fiber 19, so that substantially all of the pump emission would undergo total internal reflection at groove facets 22 thus launching light 30 in outer core 12 with very high efficiency. For an outer core 12 numerical aperture of 0.3 outer core waveguide 12 acceptance angle is 17.5°, thus virtually all of the laser's emission would be captured by outer core waveguide 12. The reflectivity of groove facets 22 can approach 100% for a wide range of incidence angels when thin film reflective coating 55 is placed on groove surface 24.

Although the foregoing dimensions are merely exemplary, the dimensions involved are not atypical of commonly used optical fibers. Thus, one can see that, a groove such as 18 permits injection of light from broad area laser diodes (i.e. inexpensive laser diodes) with high efficiency. This is equally so for the examples given below.

Figure 4:
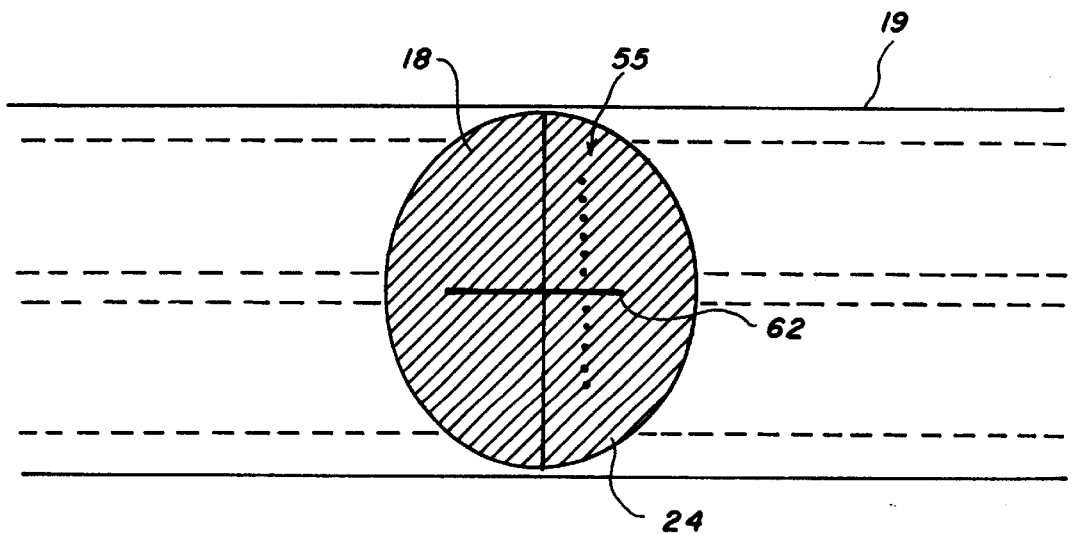
FIG. 4. is a top elevational view in the direction indicated as 4—4 in FIG. 1.

Referring to FIG. 4, and once again to FIG. 3, and assuming, for example, a typical emission aperture of 100 $\mu$m for a 1.0–2.0 w broad area laser diode 16, the output light cone in the junction plane diverges to a width of 112 $\mu$m at the opposite side of fiber 19 cross section. For a 105 $\mu$m wide groove 18, substantially all of pump light 30 would therefore be intercepted and coupled into fiber 19. Fibers with large outer core diameters can be used to allow larger groove width. Of course, lenses could be placed, if one desired, in between laser diode 16 and fiber 19 to decrease the beam divergence or to project a reduced image of the laser emission aperture on the groove. Laser 16 can also be oriented as shown in FIG. 3, or rotated by 90°, so that the emitting area is parallel to the apex of groove 18.

Figure 5:
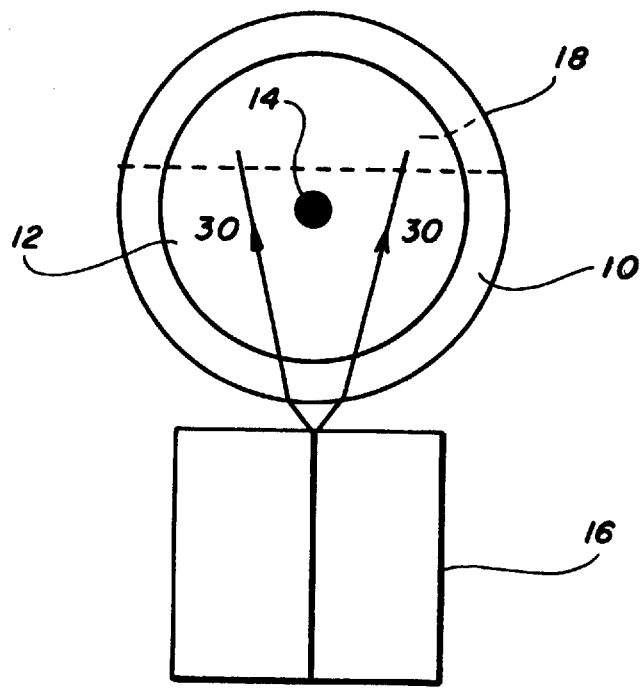
FIG. 5. is a front end view the fiber in the direction of lines 5—5 in FIG. 1.

Referring now to FIG. 5, similar considerations to those of the above example apply in the plane perpendicular to the junction 20 (i.e. the plane perpendicular to the page containing FIG. 5), where the laser diode emission area 21 is approximately 1 $\mu$m, and the pump light 30 diverges much faster than in FIG. 3, with a typical divergence angle of 40° in air or 25° in glass. With laser diode 16 placed in proximity to fiber wall 10, the emission spreads out to approximately 50 $\mu$m after propagation of a distance of one fiber diameter. Since the total length of groove 18 would typically be 100 $\mu$m at the apex, the beam spread in this plane is sufficiently small so that substantially all of pump light 30 is intercepted by groove facets 22.

The cylindrical fiber to air interface 99 provides a lensing effect which can be used to collimate or focus light 30 propagating in the plane perpendicular to the laser diode function. For example, for a glass fiber with a refractive index of 1.5, the effective cylindrical lens focal length is given by ⅓ R, where R is the fiber radius. For a 125 μm fiber OD, this corresponds to a focal length of 21 μm. Collimation is achieved with the laser diode facet placed approximately 21 μm from the fiber side-wall 10, whereas greater distances result in a converging beam.

In an embodiment which employs a doped fiber inner core pump light 30 is injected into outer core 12 where it propagates until it is absorbed by the dopant in fiber inner core 14. More efficient absorption of pump light 30 is made possible via the use of special outer core 12 shapes and off center inner core 14 placement which assure that light injected into the outer core waveguide 12 will spatially overlap with fiber inner core 14 and insure absorption of the pump light 30 by the inner core 14. On skilled in the art knows how to accomplish this once instructed on the reasons for so doing in the text of this specification. An example of such is fiber with a rectangular shaped outer core 12 with a centrally disposed inner core. Of course, if one has a fiber geometry which gives rise to modes disposed about the fiber's periphery (as is frequently the case with cylindrical fibers), one could effect spacial overlap by simply placing the inner core nearer the fiber's periphery.

Figure 6:
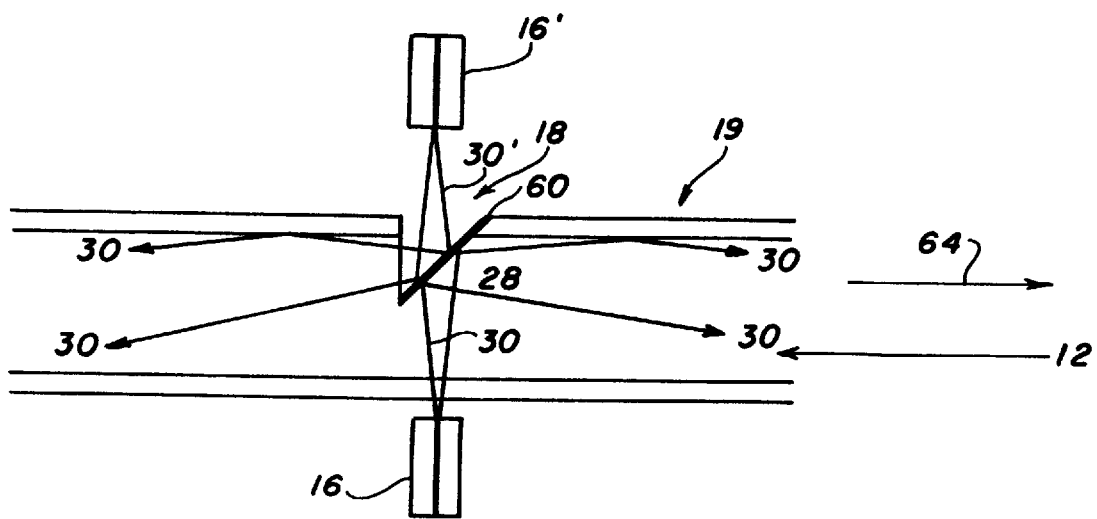
FIG. 6. is a schematic view of one configuration for pumping light from multiple lasers.

With reference to FIG. 6, a pair of lasers 16, 16' are disposed on opposite sides of fiber 19 so as to direct light beams 30, 30' to groove 18 from opposite directions along the length of fiber 19. To accomplish this face 60 is preferably disposed at about 45° to each of beams 30, 30'. Face 62 is preferably disposed at about 45° to face 60 (90° to direction 64) so that the angle at which beam 30' is incident on face 62 is as close to 90° as possible, to ensure that little of beam 30 is reflected from face 62.

Figure 7:
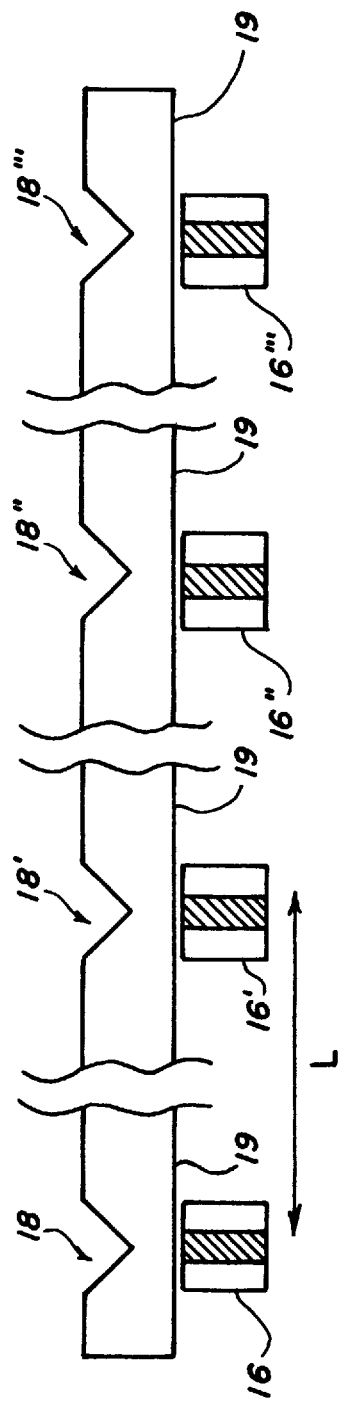
FIG. 7. is a schematic illustration of one configuration for coupling multiple sources into a cladded fiber.

Referring now to FIG. 7. which illustrates one embodiment in which multiple grooves 18 are appropriately spaced along fiber 19 to couple light from multiple lasers 16 into fiber outer core 12. This embodiment of the side pumping technique can be used to increase the total pump power in fiber 19 and scale up the fiber laser output or fiber amplifier saturation power. For a 4-level atomic transition, the spacing (L) of grooves 18 is such that almost all of the pump light injected from one groove 18 is absorbed by the gain medium before it reaches the adjacent groove 18'. For exponentially decaying pump light intensity, characterized by an absorption coefficient α, this corresponds to a spacing of approximately $2/\alpha$.

For example, in a typical Nd doped or a 3-level Er/Yb co-doped fiber, the absorption lengths are in the range of 1–10 m, while passive transmission losses for the single mode guided light are few dB/km. Multiple pump diodes 16 are multiplexed along fiber 19 with active fiber lengths of 10–100 m. In the case of a 3-level atomic transition, such as that occurring in the Er /Yb doped fiber, the pump intensity must be of sufficient magnitude to achieve gain or transparency everywhere, including regions of low pump power. Incomplete absorption of the pump power injected by one groove 18 results in coupling a portion of the residual pump out of fiber 19 by adjacent groove 18', causing a small drop in overall laser efficiency. This effect is somewhat reduced by the fact that pump intensities from two grooves overlap, resulting in a more uniform pump distribution than would be the case for end-fire pumping from a single fiber facet.

Obviously many modifications and variations of the present invention are possible in the light of the above teachings. It is therefore to be understood that within the scope of the appended claims the invention may be practiced otherwise than as specifically described.

I claim:
1. An optical fiber, comprising:
   a cladding;
   a core disposed within said cladding, said core comprising an outer core and an inner core, said inner core being disposed within said outer core, said inner core being doped with a preselected gain material;
   a groove extending through said cladding into said outer core, said groove having a surface disposed effective to specularly reflect light from a preselected direction and of a preselected frequency, into said outer core, wherein said light passes through said cladding is reflected by said groove surface and propagates down said outer core facilitating absorption of said light into said inner core.
2. The fiber of claim 1, wherein said groove comprises a pair of faces disposed generally opposite of one another along the length of said fiber, said faces intersecting one another at about a 45° angle.
3. The fiber of claim 2, wherein one of said faces is disposed at about 45° to said length of said fiber, and the other of said faces is disposed at about 90° to said length.
4. The fiber of claim 3, wherein said fiber further comprises a reflective coating disposed on said one of said faces.
5. The fiber of claim 1, wherein said groove comprises a pair of faces disposed generally opposite of one another along the length of said fiber, said faces intersecting one another at about a 45° angle.
6. The fiber of claim 5, wherein one of said faces is disposed at about 45° to said length of said fiber, and the other of said faces is disposed at about 90° to said length.
7. The fiber of claim 6, wherein said fiber further comprises a reflective coating disposed on said one of said faces.
8. The fiber of claim 1, wherein said fiber comprises at least one additional groove, said at least one additional groove having a surface disposed effective to specularly reflect light from a preselected direction and of a preselected frequency into said core.
9. The optical fiber of claim 1 comprising at least one groove extending through said cladding into said outer core, said at least one groove having at least one surface disposed effective to specularly reflect light from preselected directions and of preselected frequencies, into said outer core facilitating absorption into said inner core.
10. A method of injecting light of a preselected frequency into an optical fiber, said method comprising:
   providing a groove in said fiber, said groove extending through a cladding into a core, said groove having a surface disposed effective to specularly reflect light from a preselected direction and of a preselected frequency, into said core;
   directing light of said preselected frequency onto said groove wherein said light passes through said cladding is reflected by said groove surface and propagates down said core.
11. The method of claim 10, wherein:
   said core is an outer core, said fiber comprises an inner core disposed within said outer core, said groove extends into said outer core, and said inner core comprises an optically active preselected gain material, and
   wherein said reflecting of said light down said outer core is effective to excite said dopant by optical coupling of said light between said inner and said outer core.
12. The method of claim 10 comprising at least one optical fiber, each of said fibers comprising a cladding, an inner core and an outer core and having at least one groove extending through said cladding into said outer core.

13. An optical fiber, comprising:

a cladding;

a core disposed within said cladding; said core comprising an outer core and an inner core, said inner core being disposed within said outer core, said inner core being doped with a preselected gain material;

a groove extending through said cladding into said outer core said groove having a surface disposed effective to provide total internal reflection of injected light from a preselected direction and of a preselected frequency into said outer core;

wherein said light passes through said cladding, is reflected by said groove surface and propagates down said outer core facilitating absorption of said light into said inner core.

14. The fiber of claim 13, wherein said groove comprises a pair of faces disposed generally opposite of one another along the length of said fiber, said faces intersecting one another at about a 90° angle.

15. The fiber of claim 14, wherein one of said faces is disposed at about 45° to said length of said fiber, and the other of said/faces is disposed at about 90° to said length.

16. The fiber of claim 15, wherein said fiber further comprises a reflective coating disposed on at least one of said faces.

17. The fiber of claim 13, wherein said groove comprises a pair of faces disposed generally opposite of one another along the length of said fiber, said faces intersecting one another at about a 90° angle.

18. The fiber of claim 17, wherein one of said faces is disposed at about 45° to said length of said fiber, and the other of said faces is disposed at about 90° relative to said length.

19. The fiber of claim 18, wherein said fiber further comprises a reflective coating disposed on at least one of said faces.

20. The fiber of claim 13, wherein said fiber comprises at least one additional groove, said at least one additional groove having a surface disposed effective to specularly reflect light from a preselected direction and of a preselected frequency into said core.

21. A method of injecting light of a preselected frequency into an optical fiber, said method comprising:

providing a groove in said fiber, said groove extending through the cladding into the outer core, said groove having a surface disposed effective to specularly reflect light from a preselected direction and of a preselected frequency into said outer core, said fiber having an inner core disposed within said outer core, said inner core comprising an optically active gain material;

directing light of said preselected frequency onto said groove from said preselected direction;

wherein said directing of said light is effective to excite said gain material by optical overlap of said light in said outer core with said inner core, said light in said inner core being amplified.

22. The method of claim 21, wherein:

said core is an outer core, said fiber comprises an inner core disposed within said outer core, said groove extends into said outer core, and said inner core comprises an optically active preselected gain material, and wherein said directing of said light is effective to excite said dopant by optical overlap of said light in said outer core with said outer core, said light in said inner core being amplified.

23. An optical fiber amplifier, comprising:

a clading;

a core disposed within said cladding; said core comprising an outer core and an inner core, said inner core being disposed within said outer core, said inner core being doped with a preselected gain material;

a groove extending through said cladding into said outer core said groove having a surface disposed effective to specularly reflect light from a preselected direction and of a preselected frequency, into said outer core facilitating absorption into said inner core;

wherein said light absorbed into said inner core is amplified and propagates upetrubed through said inner core.

24. The optical fiber amplifier of claim 23 comprising at least one groove extending through said cladding into said outer core, said at least one groove having at least one surface disposed effective to specularly reflect light from preselected directions and of preselected frequencies, into said outer core facilitating absorption into said inner core.

25. The optical fiber amplifier of claim 23 comprising at least one optical fiber, each of said fibers comprising a cladding, an inner core and an outer core and having at least one groove extending through said cladding into said outer core.

* * * * *